United States Patent [19]
Boyd

[11] Patent Number: 5,337,959
[45] Date of Patent: Aug. 16, 1994

[54] SPRAY CONTROL SYSTEM FOR MULTIPLE SEGMENT BOOM SPRAYERS

[76] Inventor: Ron Boyd, 3717 Brangus Rd., Georgetown, Tex. 78628

[21] Appl. No.: 149,763

[22] Filed: Nov. 10, 1993

[51] Int. Cl.⁵ .............................................. B05B 1/20
[52] U.S. Cl. .................................. 239/163; 239/69; 239/127; 239/172
[58] Field of Search .............. 239/124, 127, 159, 163, 239/172, 69, 562; 137/563

[56] References Cited

U.S. PATENT DOCUMENTS

| | | | |
|---|---|---|---|
| 2,757,044 | 7/1956 | Gerbracht | 239/159 |
| 3,599,866 | 8/1971 | Bolton | 239/127 |
| 4,197,995 | 4/1980 | Campbell et al. | 239/127 |
| 4,518,118 | 5/1985 | Takata | 239/163 |
| 5,048,755 | 9/1991 | Dodds | 239/69 |

FOREIGN PATENT DOCUMENTS 3401734  8/1985  Fed. Rep. of Germany ...... 239/127

*Primary Examiner*—Andres Kashnikow
*Assistant Examiner*—Christopher G. Trainor
*Attorney, Agent, or Firm*—Joseph F. Long

[57] ABSTRACT

A control system for individual control of flow to each segment of a multiple segment boom sprayer wherein each segment may be turned on or off while the vehicle is in motion with instantaneous flow recycle to maintain essentially proper spray pattern from each spray nozzle and with rapid automatic adjustment to exact flow thus allowing an operator to control spray from the multiple segments to secure proper coverage with a minimum of over-spray in irregularly shaped fields.

5 Claims, 2 Drawing Sheets

SPRAY CONTROL SYSTEM FOR MULTIPLE SEGMENT BOOM SPRAYERS

BACKGROUND OF THE INVENTION

In many parts of the United States and other countries very large herbicide or insecticide sprayers are used to cover large acreage plots in the minimum time with minimum labor. Double boom sprayers with each boom 40 to 60 foot in length are not uncommon and multiple boom sprayers are coming into use. Normally there will be an automatic flow control to control flow to the booms with flow being consistent with spray nozzle size and pattern. A problem arises when these large units approach the end of rows or crop being treated if the rows are not equal length.

With normal control systems and with units traveling at 5-15 feet per second an operator either must turn off the sprays prematurely and leave some vegetation untreated or double treat other areas. This results in excess herbicide or insecticide being used to give both increased costs and increased environmental problems.

This invention is aimed at controls for multiple segment boom sprayer units to allow an operator to selectively, in effect, shorten a boom, while spraying, by operating valves in the lines from a header to segments of the multiple boom while instantly recycling an amount of liquid being sprayed that would have gone to the segment of the boom that was turned off or temporarily removed from service. Almost all control systems require a significant time to "line out" to exactly adjust a flow control. In the system of this invention the normal flow control system is upset very little by removing a portion of the spray boom or a segment of multiple booms from service. This is made possible using a plurality of quick opening valves headered to-gether with the header connecting into the flow between the flow control valve and the normal flow control meter and acting to recycle measured amounts of the flow. With each of the quick opening valves followed by a manually adjustable flow valve that is adjusted to allow passage of approximately the amount of flow that is going to the segment of the boom that is turned off and with all manually adjustable valves left in an open position and with exit from the manually adjustable valves recycling to the feed tank, segments of a boom may be instantly turned off and with the associated quick opening valves instantly opened there is instantly almost the exact proper flow going to the sprays. This is possible using automatic quick opening valves such as a solenoid or air operated valves to valve off flow to a boom segment and simultaneously open the proper quick opening valve ahead of the proper hand adjusted valve to allow recycle of very close to the same amount that is not put out to the closed off segment. With simple circuitry almost the proper recycle adjustment and therefore almost the proper amount fed to each segment of the multiple segment boom may occur in a fraction of a second. This is necessary in order that vehicle travel during the adjustment period does not leave some vegetation that is not properly treated. A controller senses the shut off of valves to segments of the boom and make the small adjustment necessary to get exactly the correct quantity through a totalizing flowmeter. The totalizing flowmeter along with input to a computer controller to indicate acreage allows an operator to read and adjust to get exact quantity sprayed on per acre.

It is understood that minor mechanical changes to the invention as outlined may be made by one of normal skill in the art therefore we wish only to be limited to the general spirit and purpose as outlined in these claims and specifications rather than to exact details.

SUMMARY OF THE INVENTION

The invention comprises a control system that allows operator control of the spray output from each segment of a multiple segment boom sprayer to cover narrower paths than full boom output. This is needed when spraying in a field wherein full boom spray would either not cover all vegetation at end of the field or would require over-spray of some of the vegetation to secure coverage. The invention comprises a compound control system wherein a normal control system controls the flow to the proper amount for full operation of all the multiple segments of the booms with this flow adjustable to accommodate special spray nozzles and give desired coverage of vegetation being treated. The invention as disclosed covers multiple booms but one of normal skill in the art could make necessary changes for dual booms. We therefore wish only to be limited to the general spirit and purpose as outlined in these claims and specifications.

The objective of this invention may be described as full coverage of the vegetation with minimum spray loss or over-spray, thus reducing cost and environmental problems.

Sprayers may commonly have forty to sixty foot booms and generally have control systems to control the flow at the desired amount for full boom or multiple segment spray operation. The controls require a time measured in minutes to "line out" to get proper flow and proper spray coverage. The need is to narrow or widen a spray path while keeping proper flow to spray nozzles in use and having proper flow through a totalizing flowmeter to allow adjustment to also have proper usage of spray per acre.

This invention fills the need as follows:

1. A pump from a spray solution hold up tank pumps through a totalizing flowmeter and with the flow sensing device of the flowmeter feeding into a controller, which may be a microprocessor type. The controller output co-operates with a control valve to initially adjust the flow to a desired full multiple segment boom spray output flow.

2. A recycle flow line takes off after the flow control valve and before the flowmeter and allows recycle of flow to the spray solution hold up tank. The recycle line is separated into a first section and a second section. Multiple take offs in the first section tie into multiple quick opening valves with each quick opening valve operating to allow flow into a manually adjustable flow controlled valve which is normally open and which may be followed by a check valve which then ties into a line going to the second section of the recycle line. The second section of the line empties into the hold up tank.

Each segment of a multiple segment boom is fed through an automatic quick opening valve with all valves being open for full operation and the quick opening valves activatable to effectively incrementally shorten or the lengthen in increments of a boom segment the spray path of the boom.

The quick opening segment valves and the quick opening recycle valve are activated through a controller that allows an operator to open a quick opening recycle valve at the same instant as a cooperating quick opening valve in a segment of the boom closes. The manually adjustable flow control valves are adjusted to pass an increment of flow that is essentially equal to the increment of flow that is shut off from the segment of the spray boom by the closure of the co-operating valve in the multiple segment spray boom. The manually adjustable flow control valves are normally all left open. A computer controller receives signals indicating position of each of the quick opening valves leading to segments of the boom and will adjust the control valve in the flow from the recycle tank to get exactly the correct flow to the spray segments in operation. The adjustment necessary is minor since the computer controller moves a set point to exact flow required by valving off or on a boom segment at the same instant that the recycle flow valve changes to give almost exact flow needed. In the system as outlined the totalizing flowmeter sees only minor changes from the exact correct flow as segments of the boom are turned off or returned to service. The flow controller may adjust rapidly to correct these minor changes. The manually adjustable flow control valves may be more closely adjusted to minimize these changes.

DETAILED DESCRIPTION OF THE DRAWINGS

The invention may best be described from the drawings.

Figure 1:
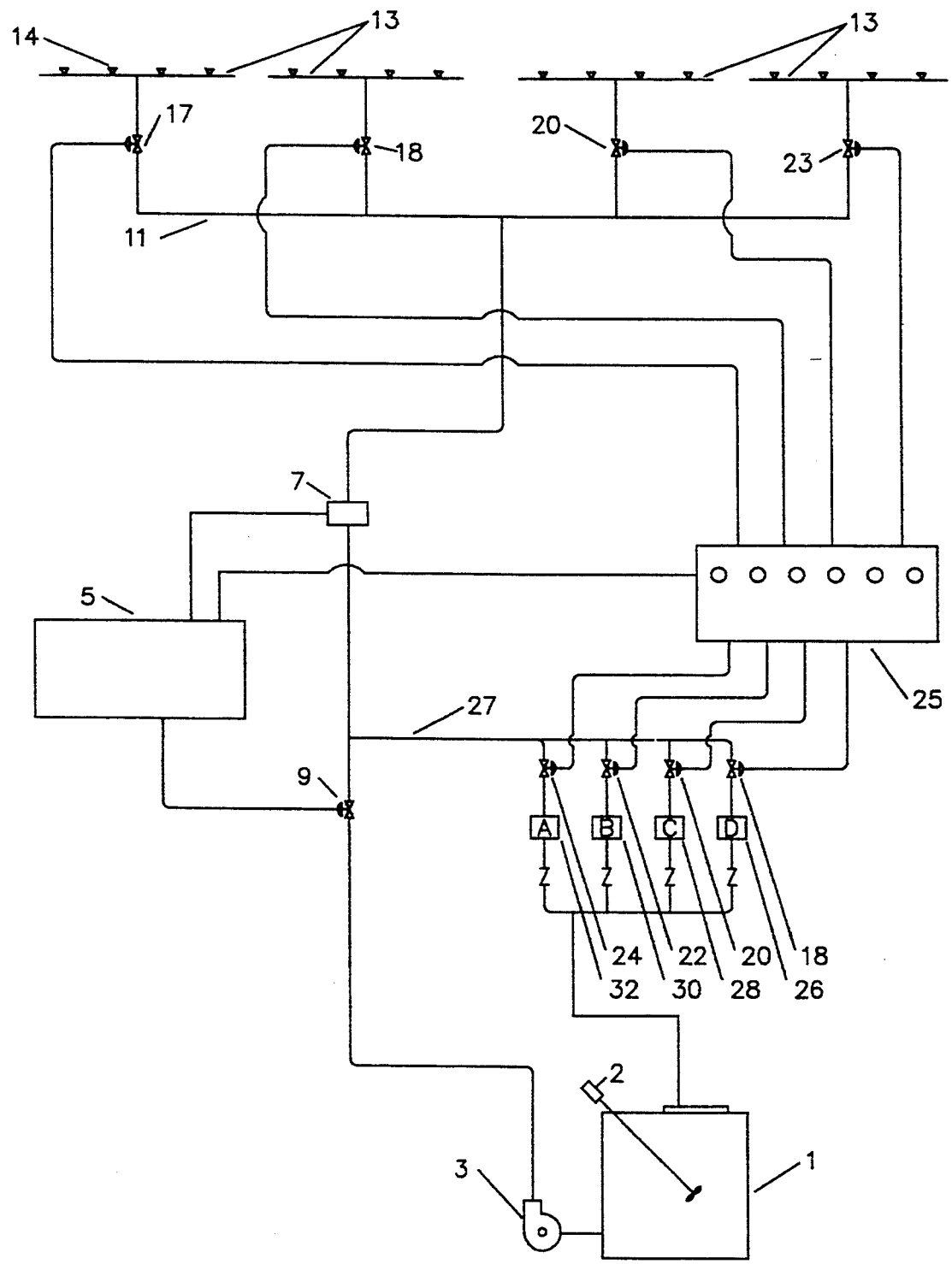
FIG. 1 shows piping and control diagram for control of each segment of a multi-segment spray boom.

Shown in FIG. 1 spray solution may be mixed with mixer 2 and held up in solution tank 1. Pump 3 pumps the solution through flow control valve 9 which is controlled by controller 5 to control flow as measured by flow measurement unit 7 and as set initially by operator setting in computer-controller 5. Controller 5 will be set to control proper flow when all segments 13 are spraying. As discussed later this controller automatically resets when segments of the boom are valved out or returned to service. Flow exit unit 7 goes to header 11 and thence through automatic quick operating valves 17, 19, 21, and 23 to segments 13 that contain spray nozzles 14. Recycle line 27 allows for recycle of measured quantities through automatic valves 18, 20, 22, and 24 and through adjustable flow control valves 26, 28, 30, and 32.

Now in FIG. 1 we've shown a multi-segment spray boom with four segments 13. Depending upon overall size and need more or less segments could be used. There would be one quick opening valve shown as 17, 19, 21, and 23 for each segment 13 of the multisegment spray boom. In the recycle header 27 there are quick opening or closing automatic valves 18, 20, 22, and 24 controlled by controller 25 so that each will operate at the same instant to close or open in a manner directly opposite the associated one of valves 17, 19, 21 and 23 leading to spray segments. Thus when the operator pushes a button in controller 25 to close valve 17 an associated valve of the group 18, 20, 22 or 24 is opened by controller 25. At the same time a signal to indicate segment valve positions is sent to computer-controller 5. Valves 32, 30, 28, and 26 are each manually or automatically adjustable to allow a flow to pass through in the same amount as fed to an associated segment 13. These valves are normally left open. When one of the quick opening valves such as valve 24 is opened there is a flow through valve 32 that is essentially equivalent to the flow turned off by closure of valve 17. Of course the system as indicated in the drawings would accommodate differing lengths of segments 13. When quick opening valve 17 to spray segment 13 is opened controller 25 acts to open an associated valve such as valve 24 and also sends a signal to computer-controller 5. With opening of recycle valve 24 essentially the proper flow is going to the spray nozzles and computer-controller 5 acts to adjust valve 9 slightly to maintain a new exact flow through totalizing flowmeter 7.

Figure 2:
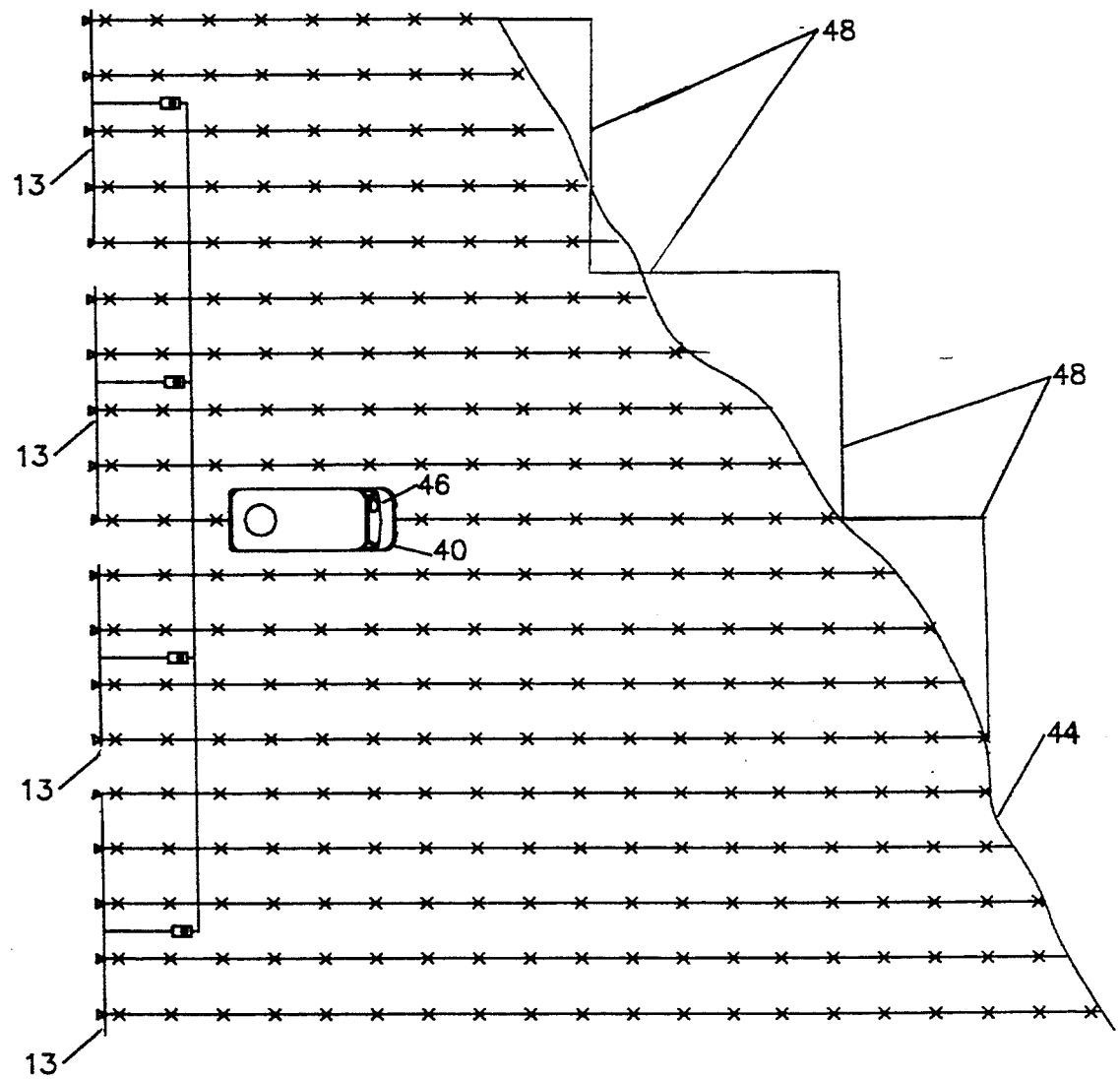
FIG. 2 shows top view of the equipment in use to indicate possible spray loss minimization.

In FIG. 2 we've shown a field with an irregular shape as indicated by line 44. When a driver 46 of a self propelled multiple spray boom unit 40 approaches the end of the field he may shut off boom segments 13 as previously discussed to achieve minimal wasted spray areas 48.

What is claimed is:

1. An Improved Spray Control System for Multiple Segment Boom Sprayer comprising:
   a) a self propelled vehicle;
   b) a spray solution tank mounted on said vehicle;
   c) a multiple segment spray boom mounted on said vehicle with each of said multiple segments mounted in the same plane;
   d) a pump, a flow meter, and a flow control valve; said pump taking suction from said solution tank and pumping through said control valve and said flowmeter to said multiple segment spray boom;
   e) a plurality of flow lines, each of said flow lines having a first quick opening valve, one of said flow lines leading to each of said multiple segments of said multiple segment spray boom;
   f) a recycle line, said recycle line having a plurality of discharge lines connected thereto, each of said discharge lines having a second quick opening valve connected between said flowmeter and said control valve; each one of said second quick opening valves in said discharge lines being automatically controlled to open when an associated one of said first quick opening valves to each of said segments is closed;
   g) a manually adjustable calibrated valve in each of said discharge lines flow through said manually adjustable valves returning to said spray solution tank.

2. An Improved Spray Control System for Multiple Segment Boom Sprayer as claimed in claim 1 further comprising:
   a check valve located in each of said discharge lines downstream of
   said manually adjustable calibrated valves.

3. An Improved Spray Control System for a Multiple Segment Boom Sprayer Comprising:
   a) a vehicle;
   b) a solution tank mounted on said vehicle;
   c) a multiple segment spray boom comprising a plurality of feed lines, one of said feed lines communicating with each segment of said multiple segment boom, each of said feed lines having a first quick opening automatic valve;
   d) a pump, a flowmeter, and a first flow control valve; said pump taking suction from said solution tank and pumping through said first flow control valve and said flowmeter to a header; said header having connections to each of said feed lines to each of said segments of said multiple segment spray boom;

e) a recycle line connected into a line between said first flow control valve and said flowmeter, said recycle line having a plurality of discharge lines connected thereto, each of said discharge lines having a quick opening recycle valve;

f) an adjustable flow control valve in each of said discharge lines, said discharge lines extending from each of said quick opening recycle valves with flow through said adjustable flow control valves returning to said solution tank; each of said adjustable flow valves being adjusted to pass approximately the equivalent flow as flows to one of the said segments;

g) a computer controller means and a second controller means; said second controller means being activatable by a driver of said vehicle to simultaneously send a signal to said computer controller, to operate one of said first quick opening valves in one of said feed lines to one of said segments and to operate an associated one of said quick opening recycle valves thereby allowing flow through one of said adjustable flow control valves to return to said solution tank; said signal to said computer controller means indicating position of said quick opening valves in each of said feed lines to said each segment and said computer-controller means acting to reset a control point of said flowmeter to correct the flow to said each segment of said spray boom that remains in operation; said computer-controller means further acting to make minor adjustment to said first control valve to rapidly and accurately achieve an exactly correct flow.

4. An Improved Spray Control System for a Multiple Segment Boom Sprayer as in claim 3 wherein functions of said computer-controller means and said controller are combined in one unit.

5. An Improved Spray Control System for a Multiple Segment Boom Sprayer as in claim 3 wherein said computer-controller means acts to calculate and display spray flow per acre to said segments of said multiple segment spray boom.

* * * * *